(12) United States Patent
Cordes et al.

(10) Patent No.: US 8,257,184 B1
(45) Date of Patent: Sep. 4, 2012

(54) DRIVELINE COUPLER

(75) Inventors: Michael Ray Cordes, Laguna Hills, CA (US); Ronald Scott Craig, Costa Mesa, CA (US)

(73) Assignee: Universal Motion Components Co. Inc., Costa Mesa, CA (US)

( * ) Notice: Subject to any disclaimer, the term of this patent is extended or adjusted under 35 U.S.C. 154(b) by 219 days.

(21) Appl. No.: 12/205,688

(22) Filed: Sep. 5, 2008

(51) Int. Cl.
*F16D 3/00* (2006.01)

(52) U.S. Cl. .......................................... 464/73; 464/136

(58) Field of Classification Search .................... 464/73, 464/160, 93, 75, 151, 152, 136
See application file for complete search history.

(56) References Cited

U.S. PATENT DOCUMENTS

| | | | |
|---|---|---|---|
| 548,191 A | 10/1895 | Griscom | |
| 731,813 A | 6/1903 | Peteler | |
| 1,201,863 A | 10/1916 | Orey | |
| 1,512,246 A * | 10/1924 | Slonecker | 464/151 |
| 2,004,299 A * | 6/1935 | Snyder | 464/75 |
| 3,405,760 A | 10/1968 | Smith | |
| 3,422,637 A | 1/1969 | Kelley | |
| 3,867,050 A | 2/1975 | Pitner | |
| 3,994,514 A | 11/1976 | Zimmerer et al. | |
| 4,032,245 A | 6/1977 | Woodruff | |
| 4,350,295 A | 9/1982 | Gheen | |
| 4,673,376 A | 6/1987 | Fender | |
| 4,747,723 A | 5/1988 | Hasley | |
| 4,787,878 A | 11/1988 | Nikkel | |
| 5,221,232 A | 6/1993 | Nameny | |
| 5,423,722 A * | 6/1995 | Beauch et al. | 464/151 |
| 5,678,772 A | 10/1997 | Bettenhausen | |
| 6,231,450 B1 | 5/2001 | Korus | |
| 6,273,824 B1 | 8/2001 | D'Ercole et al. | |
| 6,343,992 B2 | 2/2002 | Korus | |
| 6,440,000 B1 | 8/2002 | Asa | |
| 6,500,071 B1 | 12/2002 | Pollard | |
| 6,755,363 B2 | 6/2004 | Weatherl et al. | |
| 6,840,862 B2 | 1/2005 | Daniel | |

OTHER PUBLICATIONS

Universal Motion Components, CX Coupler [online][retrieved on Oct. 22, 2010]. Retrieved from the Internet:<URL: http://www.umcirr.com/CX_Coupler.html>.*
Nebraska Irrigation, Inc. Catalog pp. 7-10, Nov. 1995.
Nebraska Irrigation, Inc. Brochure "NI Drive Train Kits," Nov. 1995 in 4 pages.
Universal Motion Components, Alignment Drive Line Coupler, 2005 in 3 pages.

* cited by examiner

*Primary Examiner* — Aaron Dunwoody
(74) *Attorney, Agent, or Firm* — Knobbe Martens Olson & Bear LLP

(57) ABSTRACT

A driveline coupler can have a pair of load arms that engage with an insert member between them. The load arms can be configured to couple to shafts in a drive assembly. At least one load arm can be adjustable to couple with different sized shafts. The at least one load arm can also self center different sized shafts including different sized shafts of similar shapes. The coupler can further have a center pin to align the coupler. A coupler with a center pin can further have a fixing member to lock the coupler in alignment.

29 Claims, 15 Drawing Sheets

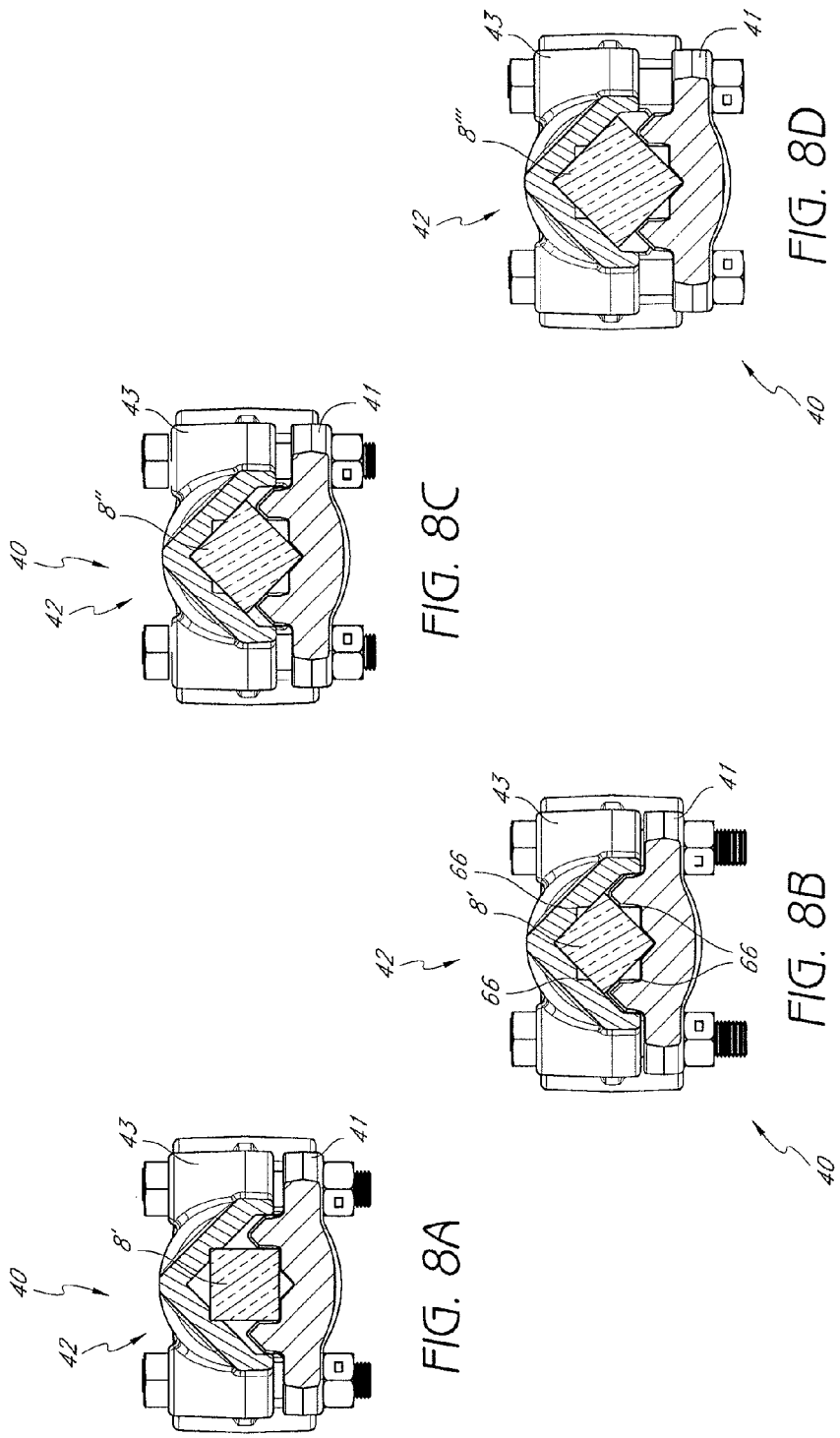

DRIVELINE COUPLER

CROSS-REFERENCE TO RELATED APPLICATIONS

N/A

BACKGROUND

The present invention relates generally to driveline couplers for connecting drive train components. In particular, the present invention relates to driveline couplers for connecting driveline components used in irrigation systems.

Irrigation systems are widely used throughout the world to provide water for agricultural purposes in arid regions. Such systems include center pivot irrigation and lateral move systems. Typically, such systems include a series of spaced apart support towers connected by truss sections that support an elevated water distribution pipe between the towers. In center pivot systems, the water distribution pipe extends radially from a central pivot communicating with a pressurized water supply. In lateral or linear move irrigation systems, the water distribution pipe extends laterally from a canal feed or hose drag system that provides a pressurized water supply.

Water passing through the distribution pipe is forced out through a number of sprinkler heads, spray guns, drop nozzles, and the like, spaced along the length of the pipe. Each tower in the system is supported on wheels that are driven at low speeds to move the tower in a circular path about the central pivot, or a linear path in the case of lateral move systems, to thereby irrigate a tract of land.

A number of drive assemblies have been developed for driving the support wheels of sprinkler irrigation systems. The most common drive assembly includes an electric motor connected to a center gear drive assembly, a first wheel gear assembly coupled to the center gear drive assembly by a first drive shaft, and a second wheel gear assembly coupled to an opposite side of the center gear drive assembly by a second drive shaft. Each of the first and second drive shafts typically has a driveline coupler at each end that allows the shafts to be quickly and easily pulled apart and put back together to facilitate field maintenance and/or towing from field to field.

Conventional driveline couplers tend to fail under very high loads and extreme duty torque conditions, resulting in downtime and increased maintenance cost of the sprinkler system. Thus, there is a need in the industry for an improved driveline coupler suitable for use in irrigation sprinkler systems and the like.

SUMMARY

According to certain embodiments, a driveline coupler for an irrigation system can comprise a first arm configured to connect to a shaft of a gearbox or motor, a second arm configured to connect to a drive shaft, a puck configured to engage the first and second arms and transmit a torque between them and a center pin. The center pin can be configured to pass through a central axis of the puck and align the puck with at least one of either the first or second arm. The second arm can comprise a base member configured to engage the puck and provide a fixed surface for engagement with the drive shaft and a securing member configured to engage and secure the drive shaft to the fixed surface of the base member and thereby to the second arm. Further, a relationship of the base member and securing member can be adjustable without adjusting the engagement between the second arm and the puck. Thereby the adjustment can be used to engage different sized drive shafts. The securing member and base member can also be configured to self center certain drive shafts including drive shafts that are different sized yet same shaped.

In certain embodiments, the center pin can be formed integrally with the first arm. The center pin can further align the puck, the first arm and the second arm. The coupler can further comprise a fixing member which can secure the center pin and thereby secure the alignment of the first and second arms and the puck.

In some embodiments, a driveline coupler for an irrigation system can comprise a first arm configured to connect to a shaft, a second arm configured to connect to a drive shaft, a puck configured to engage the first and second arms and transmit a torque between them and a center pin. The center pin can be configured to pass through a central axis of the puck and align the puck with at least one of either the first or second arm. The second arm can comprise a base member configured to engage the puck and provide a fixed surface for engagement with the drive shaft and a securing member configured to engage and secure the drive shaft to the fixed surface of the base member and thereby to the second arm. Further, a relationship of the base member and securing member can be adjustable without adjusting the engagement between the second arm and the puck. Thereby the adjustment can be used to engage different sized drive shafts.

In some embodiments, a driveline coupler for an irrigation system can comprise a first connector configured to connect to a first drive shaft and a second connector configured to connect to a second drive shaft. The first and second connectors can be coupled through a shock absorber to transmit a torque between them. The second connector can comprise a base member configured to engage the shock absorber and a securing member configured to engage and secure the second drive shaft in one of a plurality of discrete possible orientations to the base member. Each orientation can be adapted to self center one particular width of second drive shaft. According to certain embodiments, the plurality of discrete possible orientations can be two orientations. According to certain embodiments of the coupler, the coupler can be configured to be assembled and mounted on the two shafts only requiring adjustment of three similar bolts of the same size and design.

Some embodiments can further comprise a center pin. The center pin can align the first connector, the second connector and shock absorber. The center pin can pass through a central axis of the shock absorber and through a central axis of either the first or second connector. Some embodiments of coupler can further be configured as a mechanical fuse to break under high torque conditions prior to damage occurring to other components of a drive assembly.

According to additional embodiments, a driveline coupler for an irrigation system can comprise a first arm configured to connect to a shaft, a second arm configured to connect to a drive shaft, a shock absorber configured to engage the first and second arms and transmit a torque between them, a center pin, wherein the center pin passes through a central axis of the shock absorber and through a central axis of either the first or second arm and aligns the shock absorber, the first arm and the second arm and a fixing member configured to attach to a first end of the center pin and secure the center pin in place and to maintain the first arm, second arm and shock absorber in an aligned position. The center pin can pass through a central axis of both the first and second arms. The center pin can further comprise a flange at a second end and the flange can be configured to ensure that the center pin is not shifted from an aligning position. In certain embodiments, both the first arm and second arm can further comprise a U-shaped end and the shock absorber can further comprise a plurality of openings to accept the U-shaped ends.

In some embodiments, a driveline coupler can be configured for simple installation and un-installation in a highly corrodible environment. The driveline coupler can comprise a first connector, a shock absorber and a second connector. The first connector can be configured to mount on a shaft by sliding engagement and can further comprise a center pin. The shock absorber can comprise a central area with a bore through an axis of the shock absorber and multiple extensions extending from the central area. The shock absorber can be configured to mount on the first connector by sliding engagement of the bore onto the center pin. The second connector can comprise first and second protrusions, a fixed base, the first and second protrusions connected to the fixed base and a securing member. The second connector can be configured to mount onto the shock absorber by sliding engagement of the first and second protrusions between at least some of the multiple extensions of the shock absorber. The fixed base can form a fixed engagement surface to engage a drive shaft and the securing member can form an adjustable engagement surface. The second connector can be usable with different sized drive shafts and can be configured for self-centering at least two different sized drive shafts of similar shape.

Some embodiments comprise a drive assembly for an irrigation system. The drive assembly can comprise a motor having a motor shaft, a gearbox having a gearbox shaft, first and second driveline couplers, a drive shaft and a fixing member. The couplers both can comprise a first connector configured to connect to a shaft of a gearbox or motor, a second connector configured to connect to a drive shaft, a puck configured to engage the first and second connectors and transmit a torque between them and a center pin. The center pin can pass through a central axis of the puck and through a central axis of either the first or second connector and can align the puck, the first connector and the second connector. The second connectors of the first and second driveline couplers can be connected to opposite ends of the drive shaft. The first connector of the first coupler can be connected to the motor shaft and the first connector of the second coupler can be connected to the gearbox shaft. The fixing member can be connected to the center pin of the first coupler thereby locking the first and second connectors and the puck of the first coupler in an aligned position. The second coupler can be in an aligned position because of the center pin and movable from a connected to an unconnected and towable configuration. In the unconnected state, the puck can be configured such that it does not engage either the first or the second connector of the second coupler.

Embodiments can involve a method of servicing an irrigation system including the installation of drive couplers on drive assemblies. The method can comprise providing a plurality of identical drive couplers configured to be coupled to drive shafts with at least two different cross sectional areas while maintaining the axial alignment of the drive assemblies without requiring the adjustment of the alignment of the couplers. The couplers can comprise a first connector configured to connect to a shaft of a gearbox or motor, a second connector configured to connect to a drive shaft and a shock absorber configured to engage the first and second connectors and transmit a torque between them. The method can further comprise installing a first coupler on a first drive assembly where the drive shaft has a first cross sectional area and installing a second coupler on a second drive assembly where the drive shaft has a second larger cross sectional.

BRIEF DESCRIPTION OF THE DRAWINGS

FIG. 8A illustrates a driveline coupler coupled with a first sized square drive shaft in a first position.

FIG. 8B illustrates a driveline coupler coupled with a first sized square drive shaft in a second position.

FIG. 8C illustrates a driveline coupler coupled with a second sized square drive shaft in the second position.

FIG. 8D illustrates a driveline coupler coupled with a third sized square drive shaft in the second position.

DETAILED DESCRIPTION

Figure 1A:
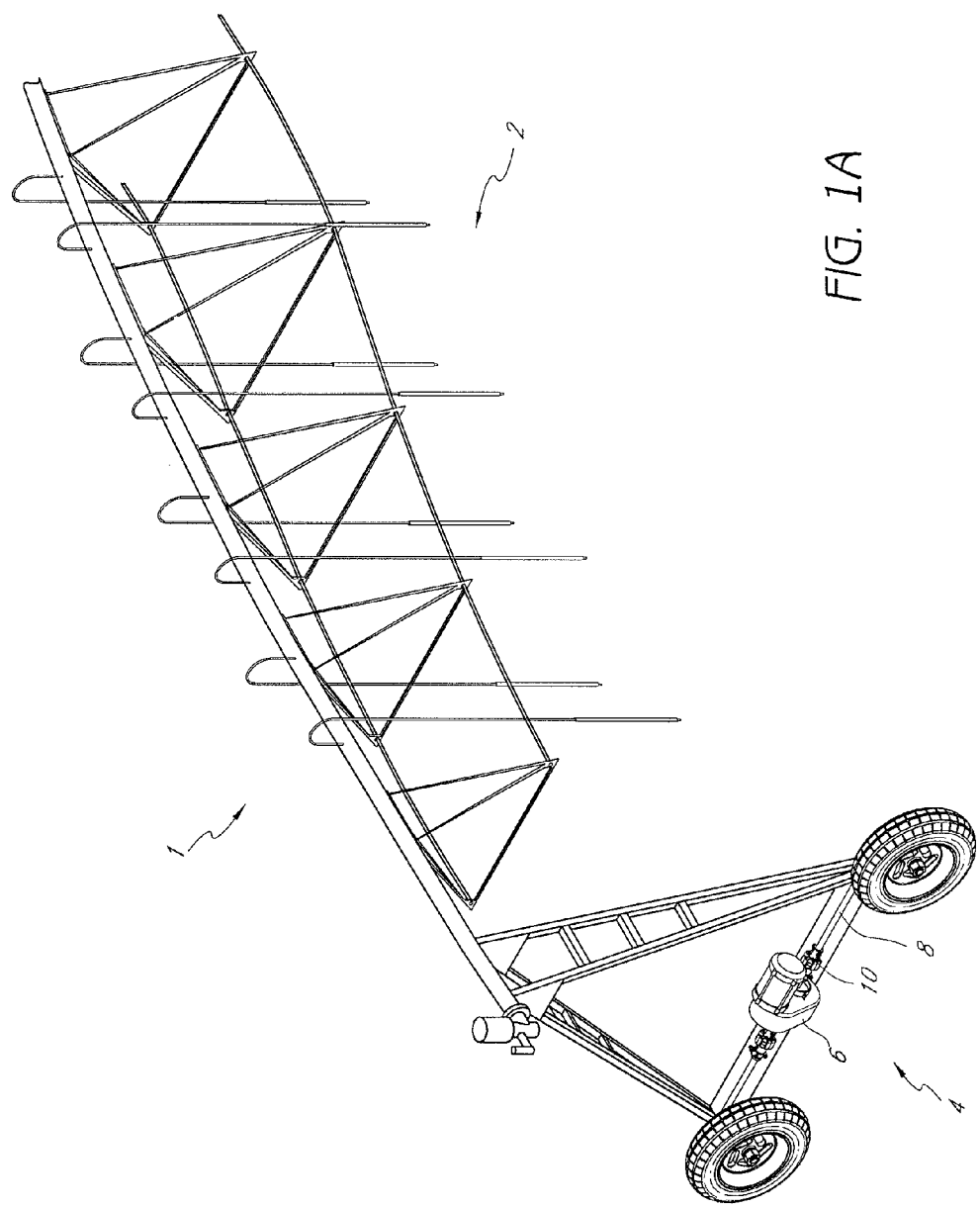
FIG. 1A illustrates part of an irrigation system with a drive assembly.
Figure 1B:
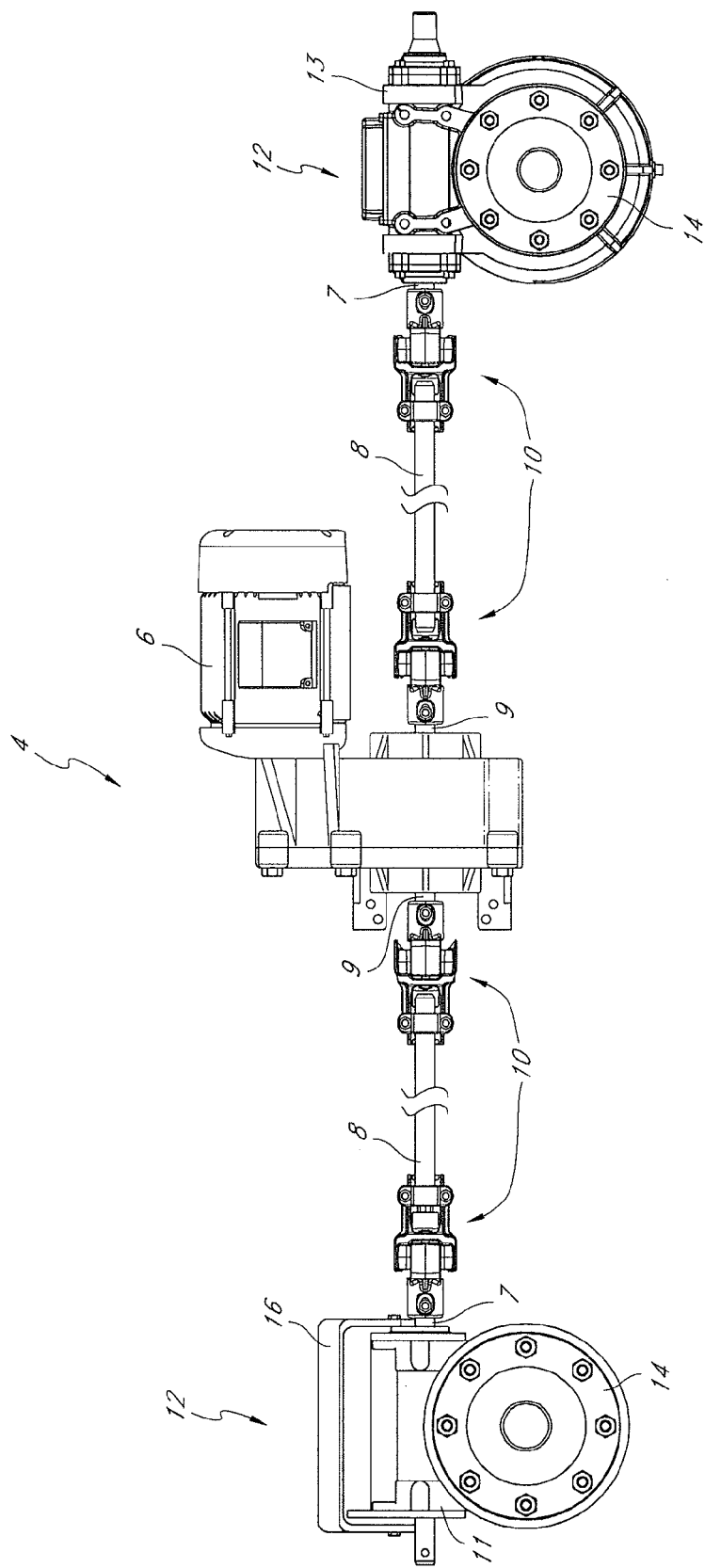
FIG. 1B shows part of a drive assembly with a center drive, wheel gearboxes, drive shafts and driveline couplers.

An irrigation system 1 for providing water for agricultural purposes and as partially shown in FIG. 1A, can have a water piping and delivery system 2 and a drive assembly 4. An embodiment of a drive assembly 4 is shown in more detail in FIG. 1B. A drive assembly 4 can have a center drive 6, a wheel gearbox 12, a shaft or drive shaft 8 and one or more driveline couplers 10. A center drive 6 can have motor connected to a gearbox to deliver a torque to a drive shaft 8. As shown in FIG. 1B, the drive assembly has a center drive 6, a first gearbox 11, a second gearbox 13, two drive shafts 8 and four driveline couplers 10. The driveline couplers 10 are shown connecting the drive shafts or shafts 7, 9 of the gearboxes 12 and center drive 6 to the drive shafts 8. Drive shafts 8 typically have a driveline coupler 10 at each end to allow the shafts 8 to be quickly and easily pulled apart and put back together to facilitate field maintenance and/or towing from field to field.

In use, hub 14 on the gearbox 12 can connect with a wheel. The center drive 6 can drive the drive shaft 8 which in turn can drive the gearbox 12. The gearbox 12 can transfer the motion of the turning drive shaft 8 into a rotational motion at the hub 14 to turn the wheel and drive an irrigation system 1.

For illustrative purposes, FIG. 1B shows a drive assembly 4 with two different types of wheel gearboxes 12. In a typical operation it may be more likely for the drive assembly 4 to have the same or similar types of wheel gearboxes 12, though this is not required. Wheel gearbox 13 is a standard wheel gearbox for a non-towable machine or system 1, i.e. for a system designed to stay in a particular field. Wheel gearbox 11 is a towable gearbox for a towable machine or system 1, i.e.

for a system that is designed to be towed to a second field after use in a first field. The towable wheel gearbox 11 has a handle 16 that can be used to disengage the gears inside the gearbox to allow free rotation of the hub 14.

Figure 1C:
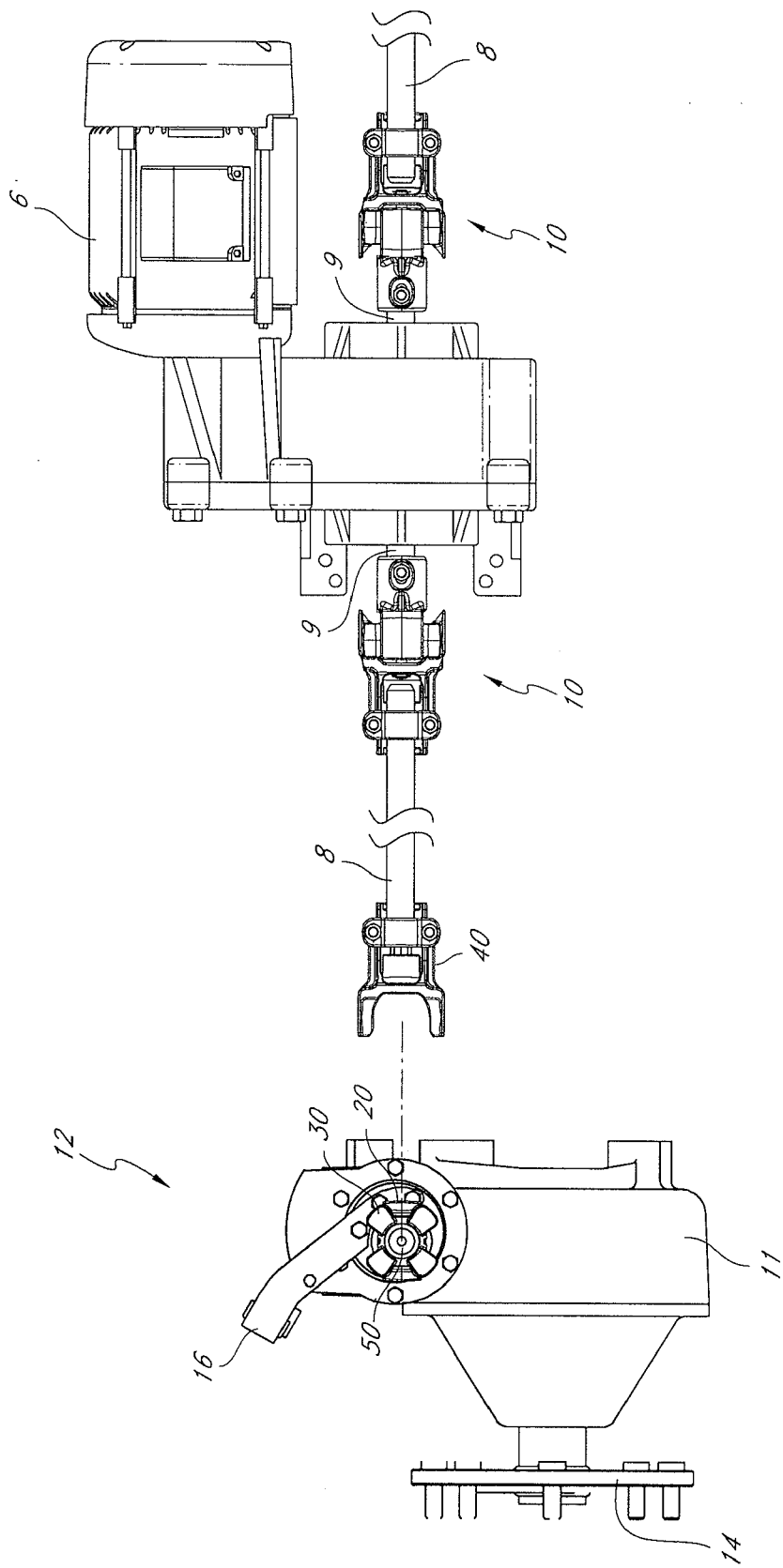
FIG. 1C shows part of a drive assembly that has been disconnected so that the irrigation system can be towed.

FIG. 1C shows a schematic view of part of a drive assembly 4 that has be converted to a towable state. A driveline coupler 10 has been separated (as will be described in more detail below) so that wheel gearbox 11 can be rotated or pivoted to a new orientation. Also handle 16 has been used to disengage the gears inside the wheel gearbox 11. In this state, the wheel gearbox 11 is no longer connected to the center drive 6 and is free to rotate. In a typical operation a farmer or user can attach a system 1 in a towable state to a tractor or truck and tow the system to a new location, such as to a different field.

An improved driveline coupler 10 will now be described. One embodiment of a driveline coupler 10 is shown in FIGS. 1D-3. A driveline coupler 10 can have a pair of load arms 20, 40 secured to opposing ends of two shafts to be coupled together by an insert member 30. The load arms 20, 40 can have a shaft end 22, 42 configured to engage a shaft and a generally U-shaped end 24, 44.

In some embodiments, the shaft ends 22, 42 can be configured to more particularly engage a particular size and shape of shaft. For example, the shaft end 22 of load arm 20 can be configured to engage a 1" round shaft which is the type of shaft typically found on center drives 6 and wheel gearboxes 12. As another example, the shaft end 42 of load arm 40 can be configured to engage square shafts which are typically used as drive shafts 8 in irrigation systems 1.

Figure 2:
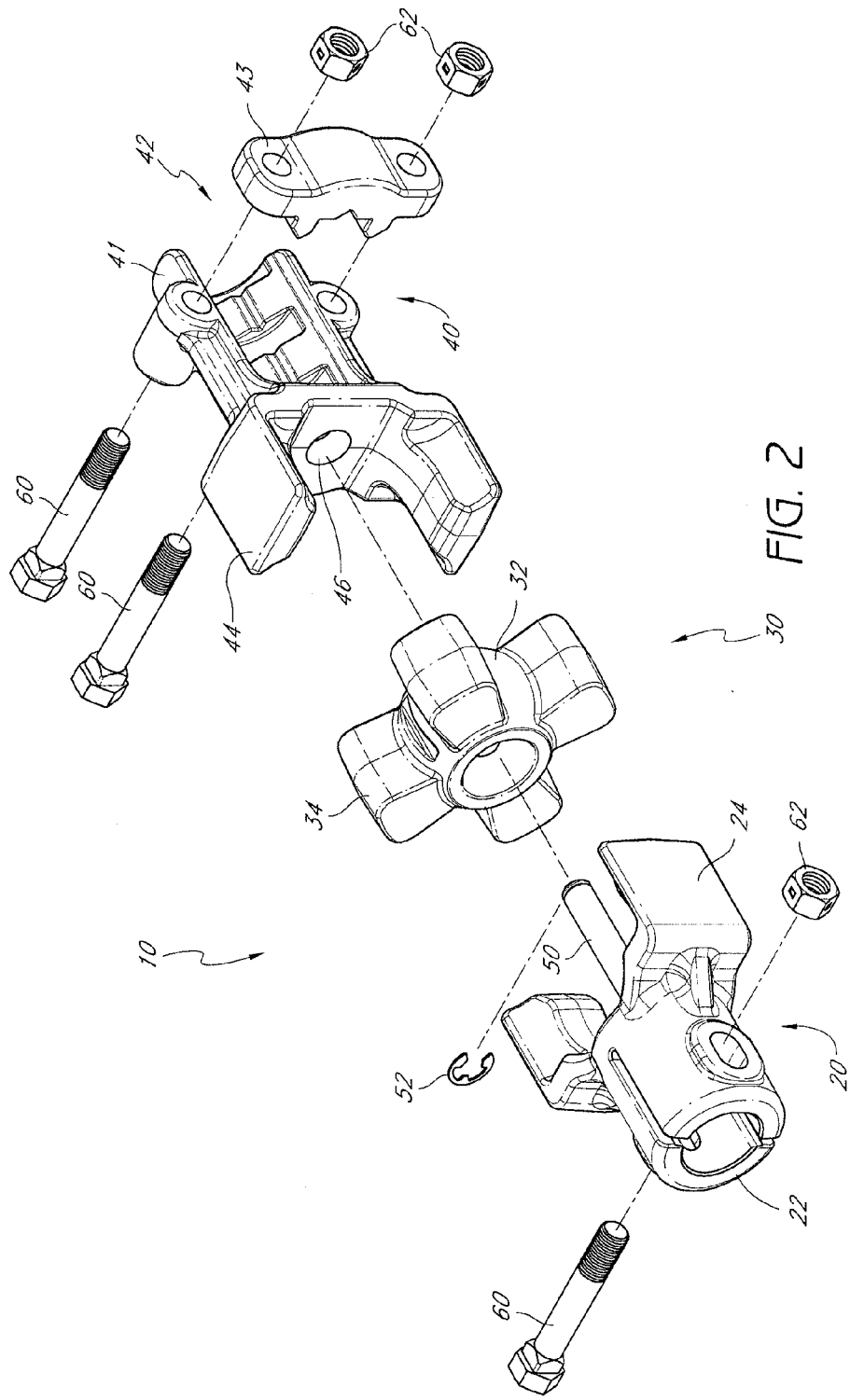
FIG. 2 shows an exploded view of the driveline coupler of FIG. 1D.

Looking to FIG. 2 a type of shock absorber or insert member 30 can be seen. An insert member 30 can have a central region 32 and one or more extensions 34 that extend outwardly from the central region 32. According to certain embodiments, the central region 32 can be essentially shaped as a sphere. In some embodiments, like that shown in FIG. 2, an insert member 30 can have four extensions 34. The shock absorber 30 can be configured to absorb shocks within the drive assembly 4. The shock absorber 30 can help extend the working life of the drive assembly 4. In addition, the shock absorber 30 can be configured to be held in place by the load arms 20, 40 without the load arms 20, 40 having contact between each other.

Figure 1D:
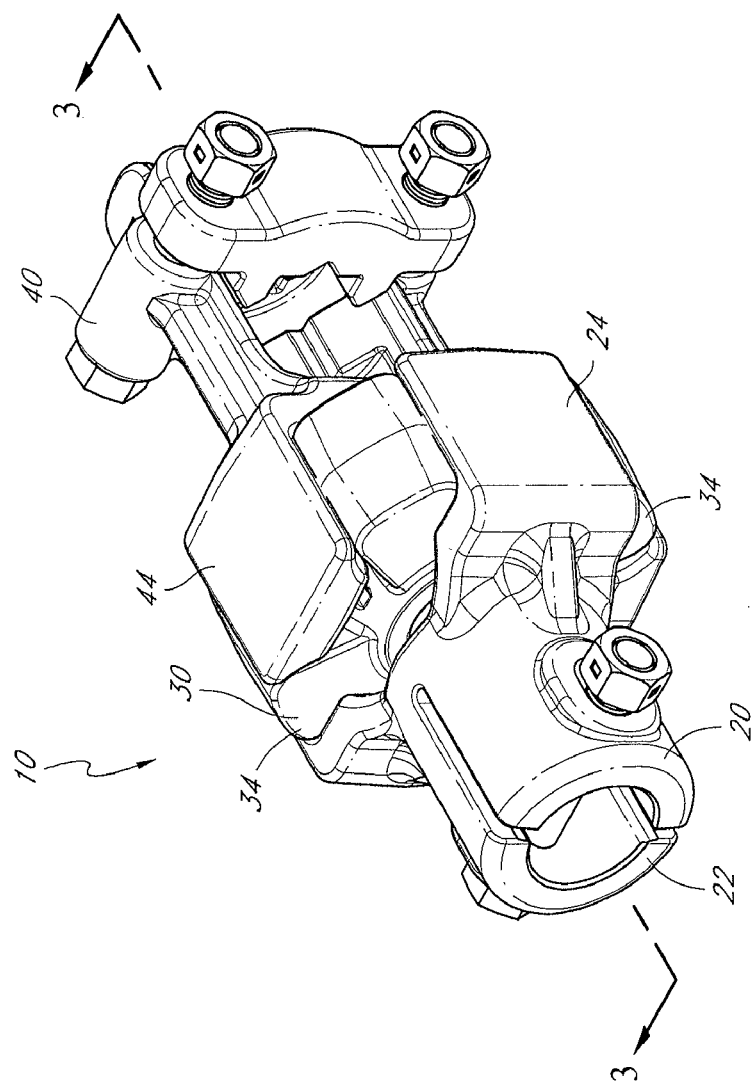
FIG. 1D shows one embodiment of a driveline coupler.
Figure 3:
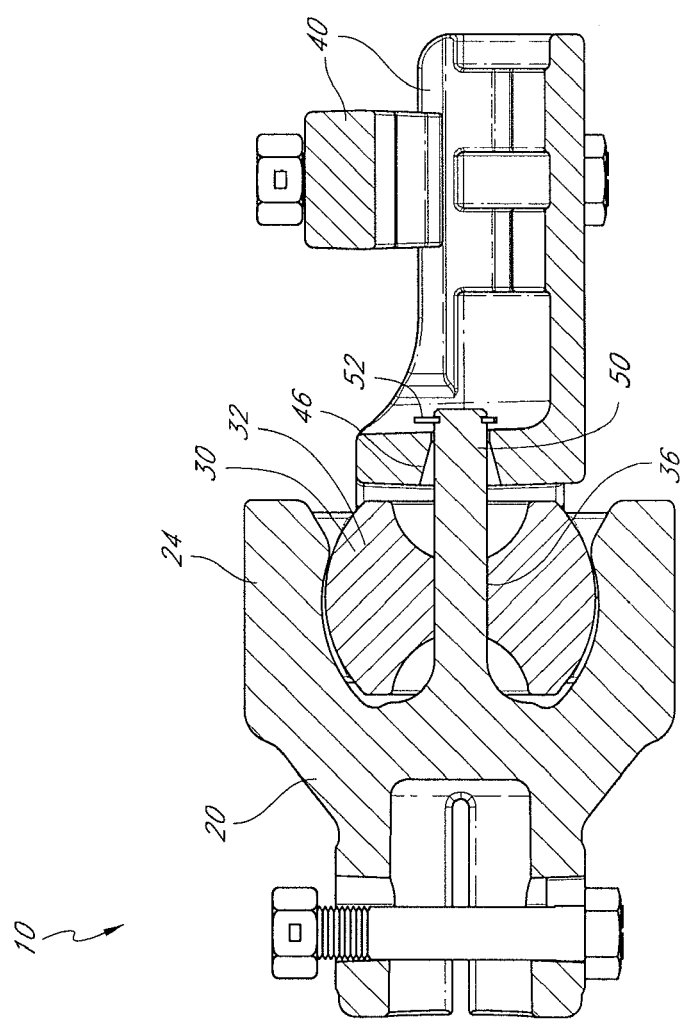
FIG. 3 shows a cross-sectional view of the driveline coupler of FIG. 1D.

FIGS. 1D and 3 show how an insert member 30 can be placed between and engaged with the load arms 20, 40. The central region 32 can be between the load arms 20, 40 and the extensions 34 can be positioned between the U-shaped ends 24, 44 of the load arms 20, 40. In certain embodiments, the U-shaped ends 24, 44 of the load arms 20, 40 can be configured and shaped to correspond with the shape and contours of the insert member 30. In operation, the rotational torque in a shaft can be transmitted through the driveline coupler 10 by the U-shaped ends 24, 44 of the load arms 20, 40 engaging and being engaged by the extensions 34 of the insert member 30.

In a preferred embodiment, the load arms 20, 40 can be manufactured from metal such as steel. The insert member 30 can be made from rubber or a plastic having elastomeric properties. In a preferred embodiment, the insert member 30 can be manufactured from polyurethane. Polyurethane can offer an environmentally stable insert with better resistance to UV rays and chemicals then certain other materials. An insert member 30 with elastomeric properties can provide shock attenuation, for example, at start up and when stopping rotation. In addition, the high torque conditions can compress an elastomeric insert member 30 instead of shearing it.

According to certain embodiments, a driveline coupler 10 can have a center pin 50 and the insert member 30 can have an orifice 36 through the center of the insert member 30. A center pin 50 can be used to align the driveline coupler 10 or parts of the driveline coupler. A center pin 50 can hold the insert member 30 in place by being placed in the orifice 36, through the center of the insert member 30. In certain embodiments, the center pin 50 can be held in place by or attached to one or both of the load arms 20, 40.

The center pin 50 can beneficially keep the coupler 10 in alignment. In certain embodiments, the center pin 50 can keep the driveline coupler 10 in alignment under extreme or sudden loads. A driveline coupler 10 with a center pin 50 can be better suited for extreme duty environments such as heavy soils, larger tire diameter, higher torque motors and stronger gearboxes. A center pin 50 can allow a coupler 10 to withstand a higher torque than a coupler without a center pin. A coupler without a center pin 50 under high torques can have a tendency to fail as the insert member 30 deforms and the U-shaped end of one of the load arms walks out of engagement with the insert member 30. High torques can be within the range of 3,000-6,000 in. lbs. torque or higher. In a preferred embodiment a coupler 10 with a center pin 50 can withstand a torque of more than 5,000 in. lbs torque without failure. In some embodiments, a coupler 10 with center pin 50 can withstand between about 4,500 and 5,500 in. lbs. torque, or between 4,900 and 5,100 in. lbs. torque or at least 5,000 in. lbs. torque but less than 6,000 in. lbs. torque or less than 8,000 in. lbs. torque.

FIGS. 2 and 3 show an embodiment of a center pin 50 that has been formed integrally with the load arm 20. The fixed center pin 50 is shown in FIG. 3 aligning both load arms 20, 40 and the insert member 30. The load arm 40 can have an orifice 46 into or through which the center pin 50 can extend. The driveline coupler 10 as shown, can have a greatly reduced part count over the prior art, whether or not the center pin is formed integrally with a load arm 20, 40.

Figure 3A:
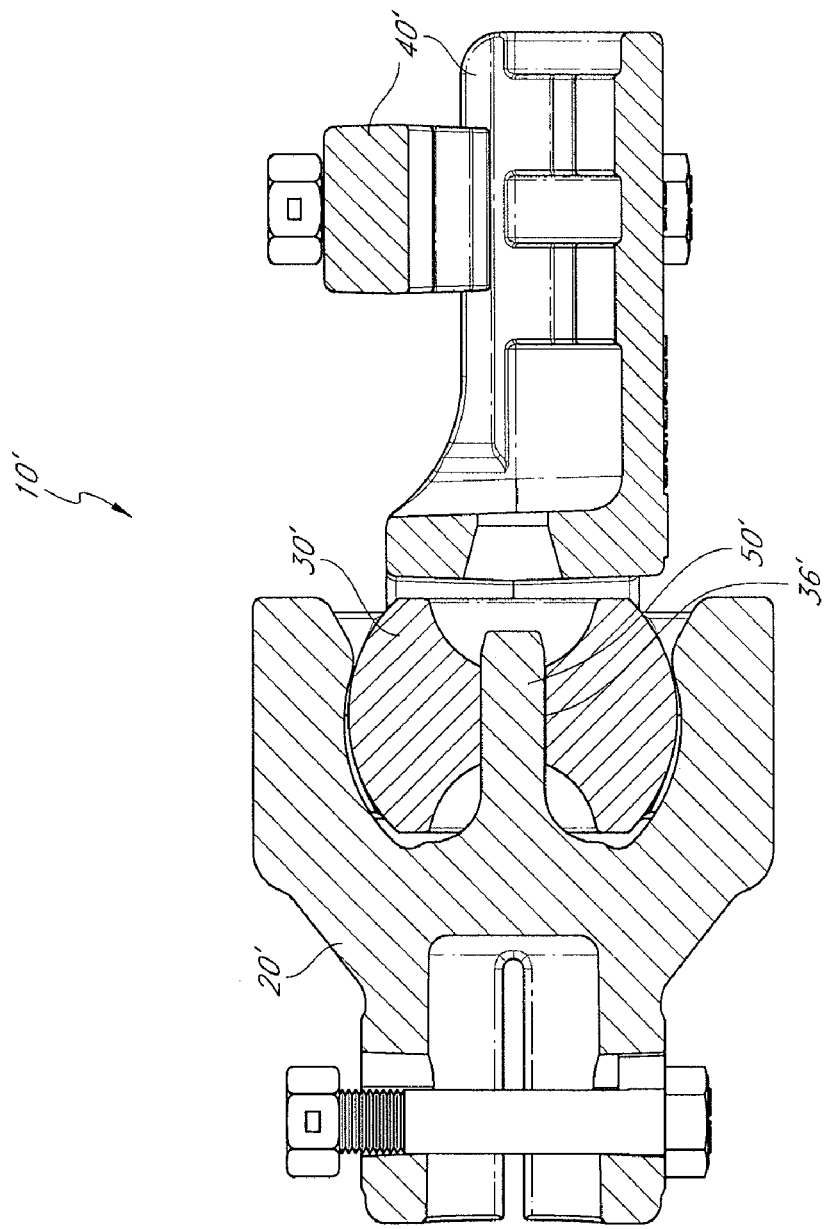
FIG. 3A shows another embodiment of a driveline coupler.

The center pin 50 can be made as an integral piece of either load arm 20, 40 of the coupler 10. The center pin 50 can be of varying lengths depending on the embodiment. In FIG. 3 the center pin 50 is shown extending from the load arm 20 through the insert member 30 and through an orifice 46 in load arm 40. Another embodiment is shown in FIG. 3A wherein the driveline coupler 10' has a center pin 50' that extends through an orifice 36' in the insert member 30' but does not extend through any part of the load arm 40'.

Figure 3B:
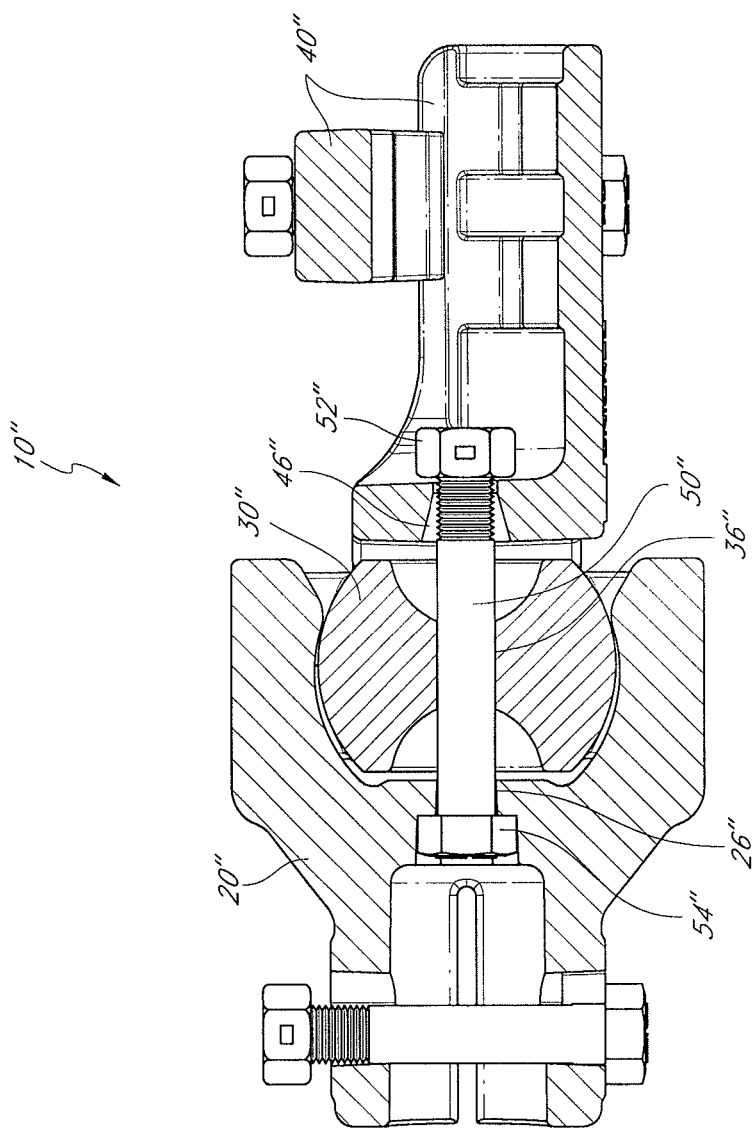
FIG. 3B shows still another embodiment of a driveline coupler.

Alternatively, the center pin 50 can be a bolt or bolt-like with a head 54 on one end where the shaft of the bolt fits through an orifice 26 or 46 on the load arm 20 or 40 respectively. FIG. 3B illustrates one embodiment that utilizes a bolt as the center pin 50". The center pin 50" is shown passing through load arm 20" through orifice 26". The head 54" of the center pin 50" can be configured such that the center pin 50" cannot pass all the way through the orifice 26" and in this way can retain the center pin 50" in place. The center pin 50" can extend through the insert member 30" and the load arm 40".

An attached center pin 50, 50' or constrained center pin 50" can provide certain advantages over a free sitting pin. For example, this feature can be especially usefully when the coupler is split in a towable operation so that the center pin will stay in place and will not be lost during transport.

Returning to FIGS. 2 and 3, a driveline coupler 10 can also comprise a fixing member 52. A fixing member 52 can comprise a clip, nut, retaining ring, locking pin, cotter pin, etc. The fixing member 52 can beneficially hold or lock the driveline coupler 10 in an assembled and aligned position. As shown, the fixing member 52 can comprise a metallic clip that can clip onto the end of the center pin 50. FIG. 3B shows an alternative embodiment, with the fixing member 52″ comprising a nut with internal threads that is screwed onto the center pin 50″.

A fixing member 52 can offer many advantages. For example, the fixing member 52 can lock the driveline coupler 10 together so that the main pieces stay together. This can be beneficial whether the coupler is installed or waiting to be installed. When in the installed and locked position the fixing member 52 can help the coupler 10 stay in an aligned configuration even when undergoing extreme conditions. When in the uninstalled position the fixing member 52 can be used to keep the coupler together. This way, even when the coupler 10 is kept with other tools or parts that could get mixed up the coupler 10 can stay assembled. This can be beneficial as this situation is likely to be found on a service repair truck.

A driveline coupler 10 configured to be able to use a fixing member 52 can have dual operation as either a locked assembly with the use of the fixing member 52 or a no tools required to disengage assembly for towable machine use that does not use the fixing member 52. As explained previously, there are two typical configurations for irrigation machines, towable and non-towable. A driveline coupler 10 can have a dual operation when it can work for either configuration. The fixing member 52 can lock the coupler 10 in the non-towable configuration. The towable configuration can not use the fixing member 52 and thereby can allow the coupler to split so that the wheels of the machine can be rotated to move or to tow the machine to another field. Splitting a coupler 10 without a fixation member 52 according to a preferred embodiment does not require tools.

As shown in FIG. 1C, a split coupler 10 in a towable configuration can have a load arm 40 maintained on a drive shaft 8 and a load arm 20 maintained on a shaft 7 of the wheel gearbox 12. Advantageously, the load arm 20 can be configured to secure the insert member 30 by the U-shaped end 24. Looking, for example, at the cross section in FIG. 3, the U-shaped end 24 can be contoured to fit the insert member 30 and can be narrower at the end then the largest outside diameter of the central area 32. A load arm 20 and insert member 30 of this type can require a small amount of force to be applied to be able to assemble or dissemble the load arm 20 and the insert member 30.

Another benefit of certain embodiments described herein, for use in the towable state is that the entire coupler 10 can be contained in one of the split halves of the coupler 10. As described above, the insert member 30 can be held by the load arm 20, this can ensure that the insert member 30 does not get lost or become lose during transportation. The center pin 50 can also be attached either integrally or by having a head 54. In this way the center pin 50 can also be contained in one of the split halves of the coupler 10 and not become lost during transportation in the towable state.

In addition, as can be seen in FIG. 1C, the identical couplers 10 can be used at both ends of the drive shaft 8. One end can have a coupler 10 coupling the center drive 6 to the drive shaft 8. The coupler 10 in this configuration can have the fixing member 52 in a fixed position on the center pin 50, locking the coupler 10 in alignment. At the other end, a second coupler 10 can connect the wheel gearbox 12 to the drive shaft 8. This second coupler 10 can maintain itself in alignment utilizing the center pin 50 but can advantageously not use the fixing member 52 so that the second coupler 10 can be easily converted to a towable state.

Figure 4B:
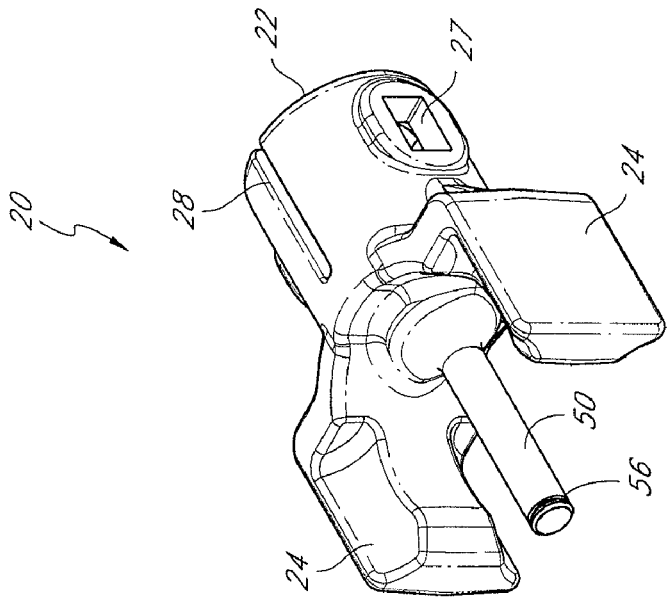
FIGS. 4A-D illustrate different views of a first load arm for connecting to a center drive or wheel gearbox.
Figure 4A:
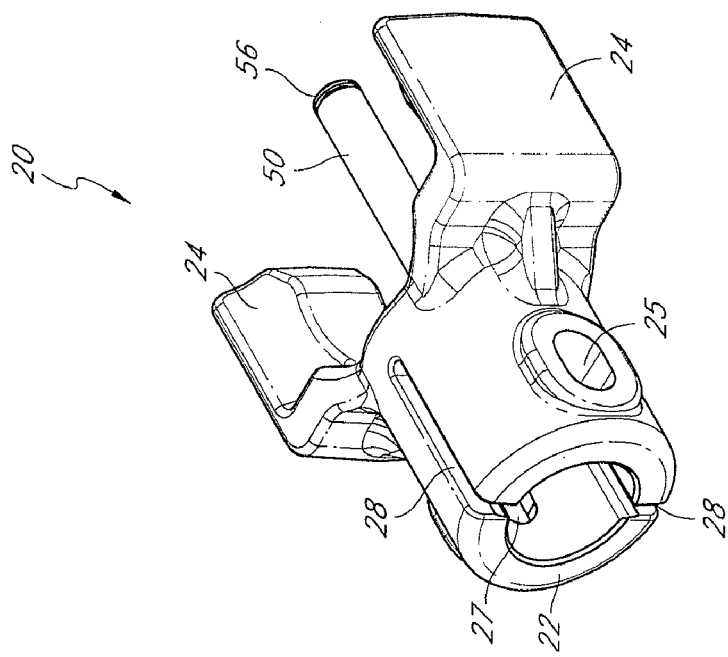
Figure 4D:
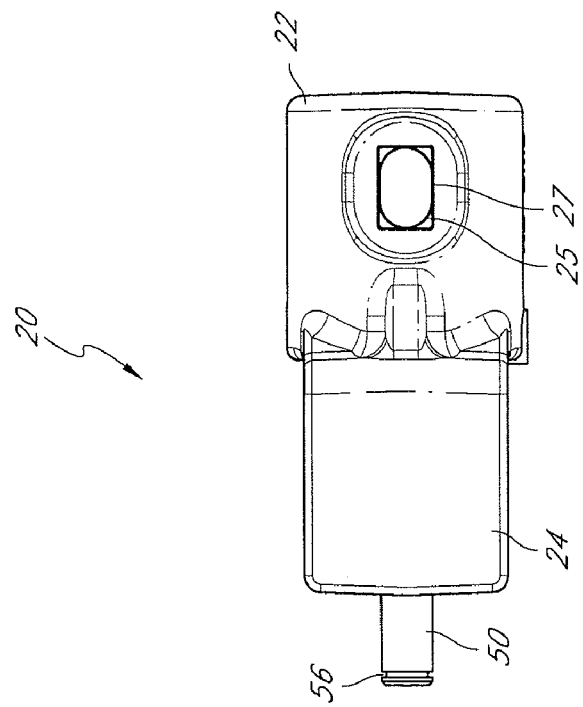

Now referring to FIGS. 4A-D an embodiment of a load arm 20 will be described in more detail. The load arm 20 can have a shaft end 22 configured to engage a shaft and a generally U-shaped end 24. The shaft end 22 can be round with a hollow center to receive a shaft. The shape of the hollow center can correspond to the shape and size of the shaft the shaft end 22 is configured to connect to. As can be seen in FIG. 4A, the shaft end 22 can be round. The round shaft end 22 can be configured to connect to a round shaft. The load arm 20 can comprise at least one slot 28. The at least one slot 28 can allow the shaft end 22 to clamp down on a shaft that has been inserted into the hollow center of the shaft end 22. A bolt can pass through slots 25, 27 as well as through a hole in the shaft and secured with a nut to secure the shaft end 22 of the load arm 20 to the shaft. As the bolt and nut are tightened, the shaft end 22 can be pressed against the shaft because of the clearance created by the at least one slot 28.

Slots 25, 27 can be configured for certain sized or types of bolts. For example, slot 27 can be rectangular (FIG. 4B) and a carriage or coach bolt 60 (FIG. 2) can be inserted into the slot 27. Slot 25 can also be rectangular or can have rounded ends as shown in FIG. 4A. The carriage bolt 60 can have a short square section under the head that can grip the side of slot 27 preventing the bolt 60 from turning when a nut 62 is tightened. In this way, the load arm 20 can be connected to a shaft using only one tool, i.e. only one wrench is needed.

Figure 4C:
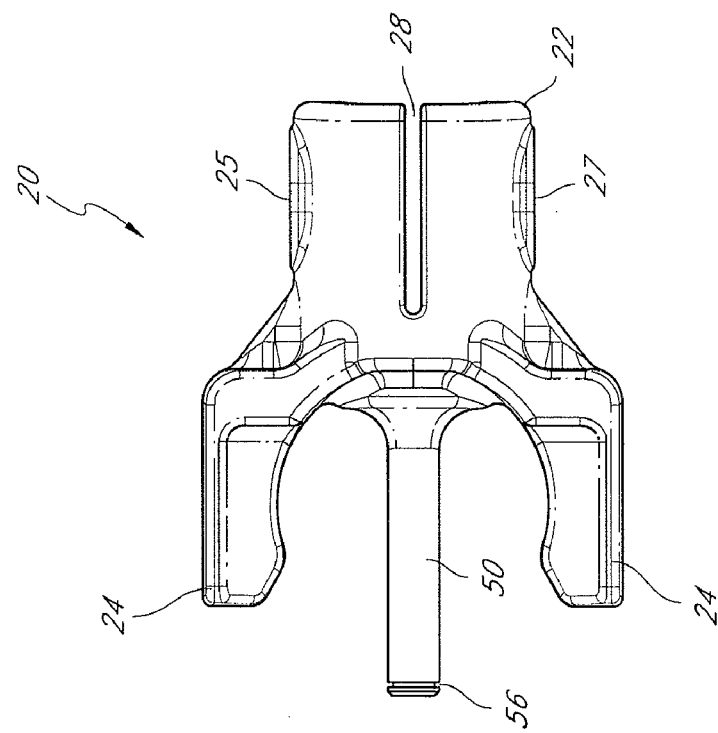

Still referring to FIGS. 4A-D an embodiment of a center pin 50 can be seen in more detail. In certain embodiments, a center pin 50 can be integrally attached to a load arm 20. The center pin 50 can extend out from the bottom of the "U" of the U-shaped end 24. The center pin 50 can have an attachment system 56 for attaching a fixing member 52. The attachment system 56 can be a groove, as best seen in FIGS. 4C and D, threads, a hole, etc.

Figure 5C:
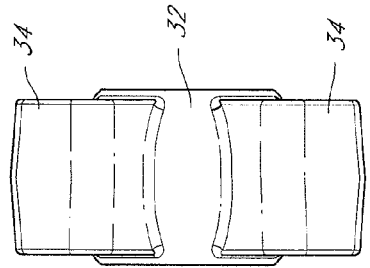
FIGS. 5A-C show a perspective, front and side view respectively, of an embodiment of an insert member.
Figure 5A:
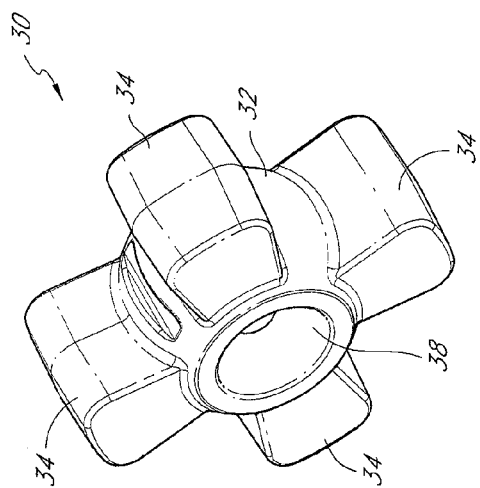
Figure 5B:
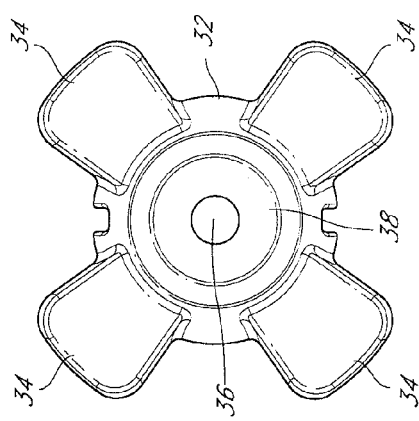

FIGS. 5A-C show an embodiment of a shock absorber or insert member 30. An insert member 30 can have a central region 32 and one or more extensions 34 that extend outwardly from the central region 32. The insert member 30 can also have a central bore 36. The central bore 36 can pass through a central axis of the insert member 30. The central bore 36 can be configured to align the insert member 30 with a load arm or load arms with the use of a center pin 50. The center pin 50 can pass through the bore 36. The insert member 30 can also have one or two cutouts 38 on the face of the central region 32. The cutout 38 can be semi-spherical shaped. The cutout 38 can allow for easier assembly or disassembly of the insert member 30 onto the center pin 50. The cutout 38 can also reduce a certain amount of stiffness when the insert member 30 is stressed in certain ways.

Turning now to FIGS. 6A-D, a first part 41 of a load arm 40 for connecting to a drive shaft is shown. The first part 41 of the load arm 40 can have a generally U-shaped end 44 and can form part of a shaft end 42 of the load arm 40. The first part 41 can have an orifice 46. The orifice 46 can be configured to receive a center pin 50. Some embodiments do not have an orifice 46 and some embodiments with an orifice can be used without a center pin 50.

Figure 6B:
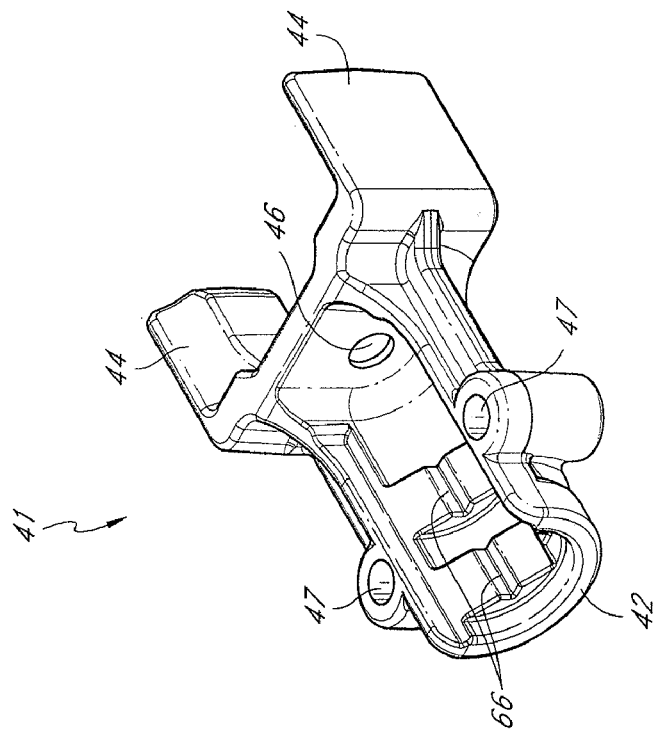
FIGS. 6A-D show different views of a first part of a second load arm for connecting to a drive shaft.
Figure 6A:
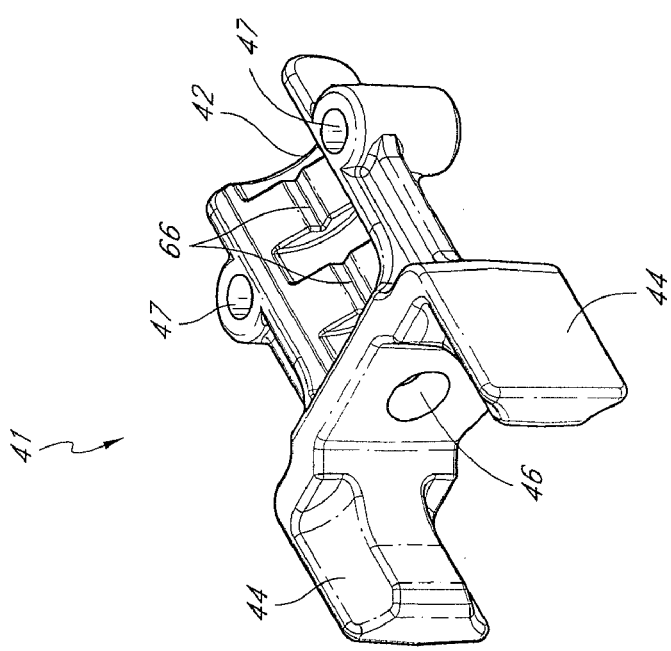
Figure 6D:
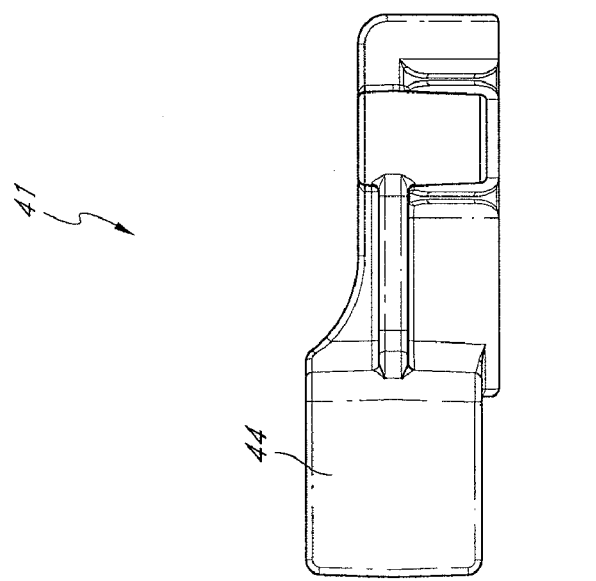
Figure 6C:
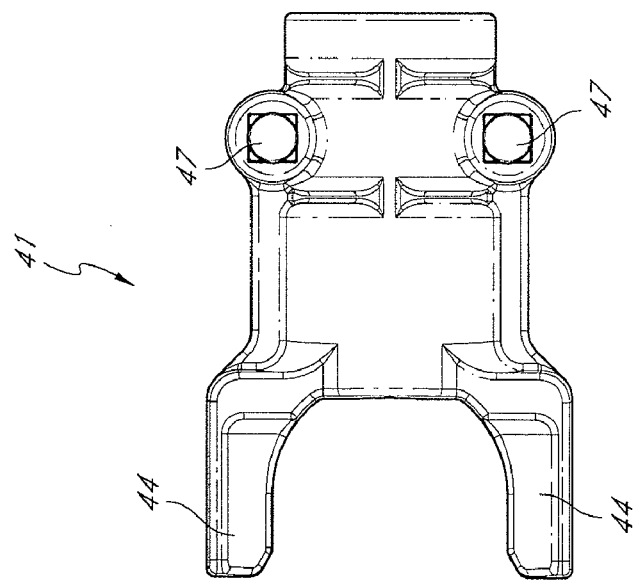
Figure 7C:
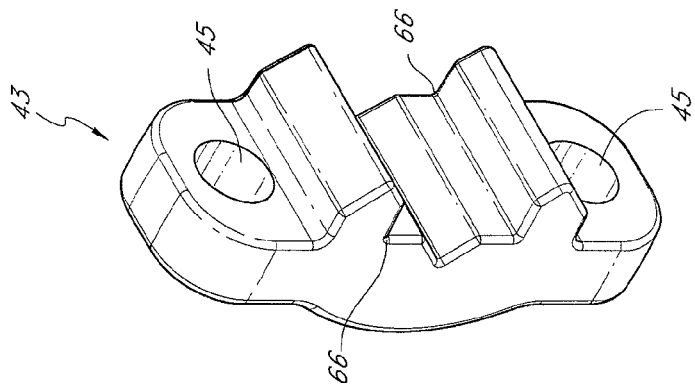
FIGS. 7A-C illustrate different views of a second part of a second load arm for connecting to a drive shaft.
Figure 7B:
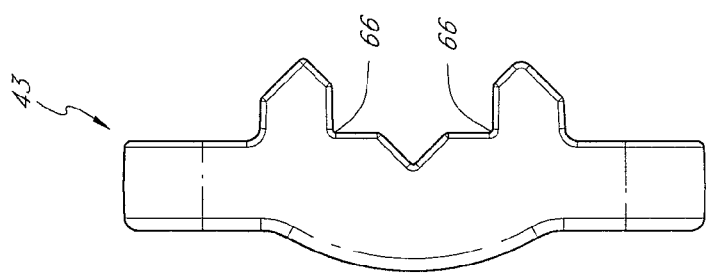
Figure 7A:
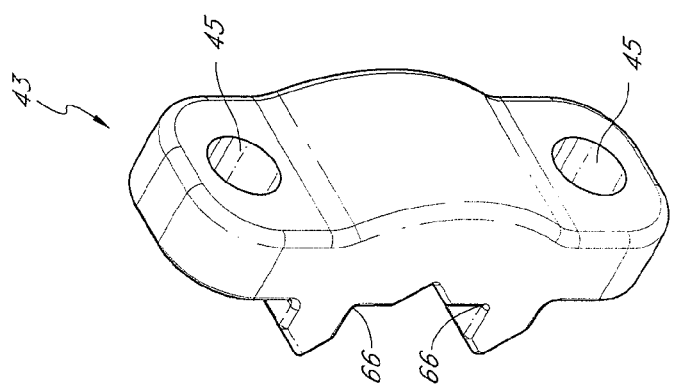

FIGS. 7A-C illustrate a second part 43 of the load arm 40. A shaft 8 can be placed between the first part 41 and second part 43. Bolts can pass through holes 45, 47 and can be secured with nuts to secure the shaft 8 in place. Similar to slots 25, 27 in load arm 20, holes 45, 47 can be configured for use with certain sized or types of bolts. For example, hole 47 can have a square end, as shown in FIG. 6C, for use with a carriage bolt 60. The carriage bolt 60 can have a short square section under the head that can grip the square end of hole 47 preventing the bolt 60 from turning when a nut 62 is tightened (FIG. 2). In this way the load arm 40 can be connected to a shaft using only one tool, i.e. only one wrench is needed.

In addition and as discussed with regards to load arm 20, the three bolts needed to assemble and mount the driveline coupler 10 in a drive assembly 4, according to a preferred embodiment, can all be the same size. Thus, the driveline coupler 10 can be assembled and mounted in a drive assembly 4 using only one tool in a simple operation of tightening only three bolts 60. The three common bolts allow for ease of assembly. A typical prior art design can have 10 or more bolts, of three or more sizes, which can lead to a complicated and time consuming assembly and mounting process. Having only three common bolts not only can greatly increase the ease of operation to set up but also the driveline coupler 10 of a preferred embodiment can be easier to maintain.

Now with reference to FIGS. 8A-D, the attachment of a shaft 8 to the load arm 40 will be described in more detail. In some embodiments, the shaft end 42 of the load arm 40 can be configured to more particularly engage a particular size and shape of shaft. For example, the shaft end 42 can be configured to engage square shafts which are typically used as drive shafts 8 in irrigation systems 1. In addition, with the shaft end 42 more particularly configured to engage a square shaft, the shaft end 42 can be used to engage shafts of other shapes, such as round shafts.

The shaft end 42 can be adjustable. Having an adjustable shaft end 42 can allow for the shaft end 42 to be used with different sized shafts. For example, the first part 41 and second part 43 of the load arm 40 can be combined to form a type of clamp. The closer together, the smaller the shaft size that will fit between them. FIGS. 8B-D show three different sized square shafts 8', 8", 8''' coupled to the shaft end 42 of the load arm 40 where the relationship of the first 41 and second 43 parts goes from fairly close to one another (FIG. 8B) to farther apart as the shaft 8 size increases (FIG. 8C and then 8D). Because of the relatively low rpms (about 45 rpms) typically used in irrigation systems 1 and the flexibility of the insert member 30, the drive shaft 8 can be slightly off-center without causing any damage to the parts. In a preferred embodiment, the shaft end 42 can be used to couple the driveline coupler 10 with any square drive shaft 8 between about ¾" and 1" (19 mm to 25 mm).

Though it can be beneficial to be able to attach the coupler to a wide number of sized shafts it can be still desirable to center the shaft if possible. An off-center shaft may not cause any damage but a centered shaft can help the drive assembly 4 as a whole have a longer useful life. In certain embodiments, the shaft end 42 of the load arm 40 can be configured to center different sized shafts. In some embodiments, the shaft end 42 of the load arm 40 can be adjustable and configured to center different sized shafts. In certain embodiments, the shaft end 42 can be self centering. A self centering shaft end 42 can allow a user to couple a shaft 8 and a shaft end 42 in a centered position without having to make further adjustments to ensure that the shaft is centered.

Self centering of different sized shafts and self centering of different sized shafts of the same shape can be two different types of problems. Whereas a shaft end configured to center, for example a 1" round shaft could also center a smaller square shaft (about ⁷⁄₁₀"), it is not as easy to center shafts that are the same shape and yet differing sizes.

According to a preferred embodiment, a shaft end 42 can be configured to self center different sized shafts of similar shapes. For example, FIGS. 8A and C show two different sized square shafts 8', 8" attached to the load arm 40, both of which are centered with the load arm 40. According to some embodiments, the shaft end 42 can hold a shaft 8 in different positions. For example, FIGS. 8A and B show a similarly sized and shaped shaft 8' held in a first position and a second position. In certain embodiments, a shaft end 42 can be adjustable and can hold a shaft in different positions. This can allow the shaft end 42 to center or self center different sized shafts and different sized shafts of similar shapes. For example, FIGS. 8A and 8C can be representative of how an embodiment of a coupler 10 could be adjustable and self center on different sized square shafts. FIG. 8A can represent a shaft 8' that could be, for example, ¾ inch and FIG. 8B can represent a shaft 8" that could be, for example, ⅞ inch.

In some embodiments, a cross-section of the shaft end 42 can have a hollow inner star perimeter 64 essentially in the form of an eight-pointed star, as best seen in FIG. 8B. In other embodiments a cross-section of the shaft end 42 can have a hollow inner star perimeter 64 in the form of a twelve-pointed star. The points of the star 64 can be formed by grooves 66 and/or the interaction of the first piece 41 and the second piece 43 of the load arm 40. So, for example, the inside perimeter 64 of the shaft end 42 can be contoured to fit a certain sized and shaped shaft in one position and grooves 66 can be added to the perimeter 64 so that the shaft end 42 can fit a different sized and/or shaped shaft in another position. More grooves 66 can be added to establish additional positions and to thereby hold and self center different sized and/or shaped shafts.

According to a preferred embodiment, a shaft end 42 can self center both a ¾" and a ⅞" square shaft. ¾" and ⅞" square shafts are commonly used in irrigation systems 1. Having a load arm 40 that is self centering with either a ¾" or a ⅞" square shaft can be highly advantageous. For example, prior art designs could only be centered on one shaft size of similar shapes or if they could be centered on different shaft sizes of similar shapes they were not self centering and required extensive adjustment to align and center. This means that for example, when maintenance is performed on an irrigation machine, the service person would have to carry different sized couplers with him/her or at least ¾ and ⅞ inch sizes, as these are the most common sized shafts. The preferred embodiment is able to handle and self center on either size of these shafts. In addition, the preferred embodiment is also able to work with other sizes besides a ¾" or a ⅞" square shaft and for example, can fit any square drive shaft between about ¾" and 1".

The drive assembly 4 and therefore the driveline coupler 10 is often used in a dirty and corrosive environment. As discussed, a driveline coupler 10 can be used on irrigation equipment 1 in fields to provide water to crops and the like. In this environment, the driveline coupler 10 can be exposed to the elements for extended periods of time. The irrigation equipment 1 can travel through dirt and rocks and the driveline coupler 10 can likewise be affected by these elements. The irrigation equipment 1 itself can be constantly wet as water is provided to the field. Also, irrigation equipment 1 is often used in hot climates. Thus, a driveline coupler 10 can also be exposed to direct sunlight, and constantly wetted and then dried by the sun. These conditions can be highly corrosive to the irrigation equipment 1.

A driveline coupler 10 as disclosed can have a reduced part count over the prior art and can have a three common bolt assembly. Such a design can greatly simply the operation and maintenance of the coupler 10 and driveline assembly 4. This is because there are fewer bolts that can become corroded and therefore fewer bolts that will need to be removed to replace a broken coupler 10, for example. In some uses, the driveline coupler 10 may be in a difficult to reach location, therefore less adjustment and minimal tool access requirements can be highly desirable, especially in light of the highly corrosive environment likely to be experienced by a coupler in use on irrigation equipment. In addition, there can be fewer bolts to assemble the new coupler 10 to replace the old one. Maintenance of the coupler 10 can be performed swiftly so that the user's time can be spent in other, more important areas.

A driveline coupler 10 can act as a fuse like link in the drive assembly 4. The driveline coupler 10 can be configured to transmit a large amount of torque and yet be configured to break to prevent damage to the wheel gearboxes 12. For this reason, a driveline coupler 10 configured for easy removal and maintenance can be highly desirable. Thus, a driveline coupler 10 with a reduced part count and a three common bolt assembly can be very beneficial to a user, such as a service repair person.

A coupler 10 under high stress can break to prevent damage to other parts of the drive assembly 4. A driveline coupler 10 can withstand a high amount of torque without failure and without damaging the other parts of the drive assembly 4. In some embodiments, a coupler 10 can withstand at least 3,000 in. lbs. torque. In other embodiments, a coupler 10 can withstand at least 5,000 in. lbs. torque. In some embodiments, the coupler 10 can break before damage is caused to the shaft 7 or drive shaft 8, including the connecting points between the coupler 10 and the shaft 7 or drive shaft 8. This can prevent the coupler 10 from stripping the drive shaft 8, and in particular, preventing a square drive shaft 8 from becoming smoothed out to a rounder shape.

Having a driveline coupler 10 that can self center the common sizes of drive shafts 8 and can be used with other sized drive shafts without damage to the drive assembly 4 can also be advantageous for the same reasons as explained above.

The driveline coupler 10 described herein can provide a flexible, convenient, and reliable system to couple and uncouple a drive shaft 8. The driveline coupler 10 can provide a reliable, extreme duty connection for drive train components. The driveline coupler 10 can be capable of transmitting a higher amount of torque than conventional driveline couplers. The driveline coupler 10 can be economical to manufacture, efficient in use, capable of a long operating life, and particularly well suited for use in center pivot or lateral move irrigation systems.

Although certain embodiments, features, and examples have been described herein, it will be understood by those skilled in the art that many aspects of the methods and devices shown and described in the present disclosure may be differently combined and/or modified to form still further embodiments. Additionally, it will be recognized that the methods described herein may be practiced in different sequences, and/or with additional devices as desired. Such alternative embodiments and/or uses of the methods and devices described above and obvious modifications and equivalents thereof are intended to be included within the scope of the present invention. Thus, it is intended that the scope of the present invention should not be limited by the particular embodiments described above, but should be determined only by a fair reading of the claims that follow.

What is claimed is:

1. A driveline coupler for an irrigation system comprising:
a first arm to connect to a shaft of a gearbox or motor;
a second arm to connect to a drive shaft;
a puck that engages the first and second arms to transmit a torque between them; and
a center pin, wherein the center pin passes through a central axis of the puck and aligns the puck with at least one of either the first or second arm;
the second arm comprising:
a base member having a first end that engages the puck and a second end that extends therefrom for engagement with the drive shaft; and
a securing member attached to the second end of the base member but not the puck, the securing member having a surface to engage a portion of an end of the drive shaft opposite from the base member and to secure the drive shaft to the second end of the base member,
the base member and securing member are adjustable with respect to one another without adjusting the engagement between the second arm and the puck and thereby permitting the base member and securing member to engage different sized drive shafts,
wherein the securing member and base member act together to accommodate and automatically center different sized drive shafts wherein the ends of the drive shafts have the same geometric cross sectional shape.

2. The coupler of claim 1, wherein the second arm can be used to couple to a square drive shaft between about ¾" and 1" and is configured to self center both a ¾" and a ⅞" square drive shaft.

3. The coupler of claim 1, wherein the center pin is formed integrally with the first arm.

4. The coupler of claim 1, wherein the center pin further aligns the puck, the first arm and the second arm.

5. The coupler of claim 4, further comprising a fixing member wherein the fixing member secures the center pin and thereby secures the alignment of the first and second arms and the puck.

6. The coupler of claim 4, wherein the center pin comprises a bolt.

7. The coupler of claim 5, wherein the fixing member comprises a nut or a clip.

8. The coupler of claim 1, wherein the first arm is configured to connect to a circular shaft.

9. The coupler of claim 1, wherein the second arm is configured to connect to a square drive shaft.

10. A driveline coupler for an irrigation system comprising:
a first arm to connect to a shaft;
a second arm to connect to a drive shaft;
a puck engaged with the first and second arms to transmit a torque between them; and
a center pin, wherein the center pin passes through a central axis of the puck and aligns the puck with at least one of either the first or second arm;
the second arm comprising:
a base member having a first end engaged with the puck and a second end for engagement with the drive shaft, the second end having a fixed positional relationship with the first end; and
a securing member attached to the second end of the base member and having a surface to engage and secure the drive shaft to the second end of the base member, such that the drive shaft is positioned between the securing member and the base member, the securing member spaced away from the puck such that a relationship of the base member and securing member is adjustable without adjusting the engagement between the second arm and the puck and thereby the adjustment can be used to engage different sized drive shafts.

11. The coupler of claim 10, wherein the securing member and base member are also configured to self center certain drive shafts including drive shafts that are different sized yet same shaped.

12. The coupler of claim 10, wherein the second arm can be used to couple to different sized square drive shafts.

13. The coupler of claim 12, wherein the different sized square drive shafts are between about ¾" and 1".

14. The coupler of claim 11, wherein the securing member and the base member are configured to self center different sized square drive shafts.

15. The coupler of claim 14, wherein the different sized square drive shafts comprise a ¾" and a ⅞" square drive shaft.

16. The coupler of claim 10, wherein the center pin is formed integrally with the first arm.

17. The coupler of claim 10, wherein the center pin further aligns the puck, the first arm and the second arm.

18. The coupler of claim 17, further comprising a fixing member wherein the fixing member secures the center pin and thereby secures the alignment of the first and second arms and the puck.

19. The coupler of claim 17, wherein the center pin comprises a bolt.

20. The coupler of claim 19, wherein the fixing member comprises a nut or a clip.

21. The coupler of claim 10, wherein the first arm is configured to connect to a circular shaft.

22. A driveline coupler for an irrigation system comprising:
- a first arm to connect to a shaft;
- a second arm to connect to a drive shaft;
- a shock absorber engaged with the first and second arms to transmit a torque between them;
- a center pin to align the first arm, second arm and shock absorber, wherein the center pin passes through a central axis of the shock absorber and through a central axis of either the first or second arm; and
- a fixing member, separate from the first and second arms, and the shock absorber, attached to a first end of the center pin securing the center pin to maintain the first arm, second arm and shock absorber in the aligned position.

23. The coupler of claim 22, wherein both the first arm and the second arm further comprise a U-shaped end and the shock absorber further comprises a plurality of openings to accept the U-shaped ends.

24. The coupler of claim 22, wherein the center pin passes through a central axis of both the first arm and the second arm.

25. The coupler of claim 24, wherein the center pin further comprises a flange at a second end, the flange configured to ensure that the center pin is not shifted from an aligning position.

26. The coupler of claim 22, wherein the center pin comprises a bolt.

27. The coupler of claim 22, wherein the fixing member comprises a nut or a clip.

28. A system including the coupler of claim 1, the shaft and the driveshaft.

29. The coupler of claim 1, further comprising at least one bolt that attaches the securing member to the base member.

* * * * *